United States Patent Office 3,483,012
Patented Dec. 9, 1969

3,483,012
COATED REFRACTORY
Richard L. Young, Martinsburg, W. Va., assignor to Martin-Marietta Corporation, New York, N.Y., a corporation of Maryland
No Drawing. Filed June 30, 1966, Ser. No. 561,737
Int. Cl. B44d *1/02;* C03c *25/02*
U.S. Cl. 117—33                         5 Claims

ABSTRACT OF THE DISCLOSURE

A coated refractory comprising particles of refractory having coated on the surface thereof a solidified resinous hydrocarbon. Advantageously about 1.2 to about 3.4 parts by weight of resinous hydrocarbon are used for each 100 parts by weight of refractory.

---

The present invention is concerned with refractories and, more particularly, with refractories containing a significant amount of hydratable lime.

In general, when refractories are manufactured from raw materials, volatile components of the raw materials are driven off, usually by heat. Such volatile components can be, and often are, water and carbon dioxide. As an example, dolomite rock, which contains calcium and magnesium carbonates together with small amounts of silica, alumina and iron compounds, is treated by dead-burning, i.e. roasting, at a temperature in excess of about 2800° F. to drive off moisture and carbon dioxide so as to form primarily lime and magnesia in a matrix that provides some resistance to hydration and carbonation.

As with most commercial commodities, refractories, such as dead-burned dolomite, are often kept in storage or inventory for many months prior to their use. During bulk storage, particularly of granular material, it is possible, and even likely, that the moisture and carbon dioxide content of the atmosphere will combine with the dead-burned dolomite so as to negate the effects of the dead-burning process. As an example, water, in the form of atmospheric vapor, can combine with lime (calcium oxide) to form hydrated lime (calcium hydroxide). This reaction will occur if unprotected dead-burned dolomite is stored even under cover for any appreciable length of time. The hydration reaction, of course, will be accelerated by moderate increases in temperature and relative humidity, such as might be expected to occur in many tropical locations. For most purposes it is undesirable that a refractory material be hydrated because when hydrated or partially hydrated refractory is placed in service, it will lose water on initial heating to operating temperature and will have a great tendency to spall and chalk due to the large volume of vapor emitted from the relatively small solid granules.

The art has recognized the problem involved in hydration of refractories, which problem is most serious in those refractories containing a substantial proportion of hydratable lime. In order to inhibit the hydration reaction, it is conventional commercial practice to apply a small quantity of oil to the surface of a hydratable granular refractory. For many purposes, especially those involving short-term indoor storage in temperate climates, oil of hydratable refractory provides satisfactory results. However, when storage periods are prolonged and/or temperatures and humidties are high, as a practical matter oiling does not provide a commercially satisfactory solution to the hydration problem. Other means of retaining the dead-burned qualities of dolomite which might be conceived have serious economic disadvantage. Dead-burned dolomite is a relatively inexpensive refractory which is sold and used in bulk lots. Bagging in waterproof sacks is very expensive as is storage in containers providing a controlled atmosphere. The economic difficulties become even more serious when one attempts to protect granular dead-burned dolomite when in transit in bulk in ships to tropical destinations. As far as is known, no entirely commercially satisfactory solution has been provided by the art for the aforestated problems.

It has now been discovered that by means of a particular coating material a commercially advantageous, coated, granular, lime-containing refractory can be produced.

It is an object of the present invention to provide a novel coated refractory of improved hydration resistance.

It is another object of the invention to provide a novel, coated, lime-containing refractory having improved resistance to hydration.

A further object of the present invention is to provide a process for producing a novel refractory having improved resistance to hydration.

A still further object of the present invention is to provide a process for producing a novel coated lime-containing refractory having improved resistance to hydration. Other objects and advantages will become apparent from the following description.

Generally speaking, the present invention contemplates a granular refractory composition, capable of hydrating under storage conditions through naturally-occurring atmospheric moisture, having on the surface thereof a coating containing a resinous mixture of solidified aryl and alkaryl hydrocarbons. More particularly, the granular refractory composition is one which contains calcined lime (calcium oxide) which will react with water vapor and/or carbon dioxide in the air to produce a calcium compound. In addition to the resinous mixture of solidified aryl and alkaryl hydrocarbons (advantageously amounting to at least about 50% by weight), the coating can contain other resinous materials such as polyvinyl chloride, vinyl-chloride-vinyl isobutyl ether copolymer, polyphenylene oxide, coumarone indene resins, partially hydrogenated terphenyls, polychlorinated polyphenyls and cyclohexanone resins in a minor proportion with or without the inclusion of effective amounts of plasticizers such as dibutyl sebacate, dioctyl phthalate, tricresyl phosphate, alkyl benzyl benzenes, naphthalene or indene. Further, it is within the contemplation of the present invention that the coated refractory may have a further coating comprising a dusting of an anti-sticking agent in powder form, such as graphite, serpentine or talc.

In carrying out the present invention it is advantageous to relate the amounts of coating and refractory such that in parts by weight there will be present at least about 1.2 parts by weight and up to about 3.4 parts by weight of resinous coating to 100 parts by weight of granular refractory. The weight ratio of resinous coating to refractory depends in part upon the size of the refractory granules. In general, the larger the refractory granules, the less resinous coating is necessary. On the other hand, if very fine refractory granules are used, more resinous coating will be required. In preparing the product of the present invention it is advantageous to melt the resinous material to be employed as the coating and spray or otherwise deposit the molten material upon refractory granules which are maintained at a temperature of at least about 175° F. Substantially all of the resinous materials employed by us have a fusing point in excess of about 120° F. and can be conveniently sprayed in the molten form with the refractory grains being maintained at a temperature of about 350° F. Normally, coating temperatures should not exceed about 450° F. in order to avoid deleterious volatilization or thermal breakdown of the resins.

It is to be noted that resinous materials employable in accordance with the present invention as coatings on lime-containing, hydratable refractories must not only possess the physical characteristics required for spraying or other convenient application in liquid form but also must have certain chemical characteristics not specifically related to hydration protection. For example, to be reasonably useful in refractory applications, the resinous coating must be capable of burning off or otherwise volatilizing without leaving any substantial carbonaceous residue. The coating must also be devoid of any significant amounts of elements or compounds which might prove undesirable in the final structure in which the refractory is to be used. For example, granular dead-burned dolomite is often used in steel furnaces. For this purpose the coating should not contain any substantially significant amounts of sulphur or other like element which could prove detrimental to steel made in the furnace repaired or constructed with the coated dolomite refractory. A resinous material should also be devoid of any material which would tend to form compounds with lime or magnesia, which compounds would be stable at temperatures above those which would be sufficient to volatilize the remaining components of the resinous material. Formation of such compounds like formation of hydrated species could prove to be detrimental by increasing dusting and spalling.

In carrying the present invention into practice, it is advantageous to employ a coated granular refractory containing dead-burned dolomite grains coated with a resinous material containing at least 50% by weight of petroleum residue resins such as those sold under the Monsanto designations of Resin PR 140, Resin TR 165, Resin TR 195. Such petroleum residue resins are substantially completely aromatic in nature and consist of a mixture of alkyl benzenes, alkyl styrenes, alkyl indenes, alkyl indanes, napthalene, alkyl naphthalene, acenaphthene, acenaphthalene, fluorene, alkyl fluorenes, phenanthrene, alkyl phenanthrenes, alkyl anthracenes, pyrene and higher condensed systems. Resin PR (120) is a petroleum bitumen resulting from the refining of carefully controlled feed stock for production of ethylene. It is not an asphalt and is not a true petroleum pitch. It is similar to coal tar pitch, but contains no compounds of oxygen or nitrogen and the sulfur content is low. Resins PR–140, TR–165, TR–195 result from thermal processing of PR. Where storage temperatures are relatively high, for example, over about 100° F. and cohesion may result from the resinous coating becoming tacky, it is advantageous that powdered talc be applied to the surface of the coated refractory to inhibit agglomeration thereof. While powdered talc is an inexpensive material for this purpose, it can be replaced by powdered serpentine or powdered graphite or other powdered anti-sticking agents which are economically advantageous. In general, it is advisable to employ not more than about 2 parts by weight of anti-sticking agent to 100 parts by weight of coated refractory.

EXAMPLES

A dolomite refractory containing in weight percent about 54% lime, 38% magnesia, 1% silica, about 6% ferric oxide and about 1% alumina in the form of ¼ inch to ⅜ inch grains was coated at a grain temperature of 350° F. with various resinous coatings as set forth in Table I.

TABLE 1

| Example No. | Resin | Parts by wt. of resin to 100 pts. by wt. of Dolomite |
|---|---|---|
| 1 | PR | 1.9 |
| 2 | PR 140 | 1.9 |
| 3 | 100 pts. by wt. PR 140 and 2 pts. by wt. Vinoflex MP 400 [1] | 1.9 |
| 4 | 100 pts. by wt. PR 140 and 5 pts. by wt. of Vinoflex MP 400 [1] | 1.9 |
| 5 | 100 pts. by wt. PR 140, 2½ pts. by wt. dibutyl sebacate and 2½ pts. by wt. of polyphenylene oxide. | 1.9 |

[1] Vinoflex MP 400 is a trade designation for a Vinyl Chloride-Vinyl Isobutyl ether Copolymer.

Accelerated hydration tests, indicative of the merit of the coating resins of Examples Nos. 1 to 5, as compared with the merit of unprotected refractory and refractory coated with oils or a coal tar resin for long-term storage under humid tropical conditions, were conducted. These tests consist of exposing samples of the various refractory compositions to a temperature of 160° F. and 85% relative humidity (R.H.) for standard times and subsequently determining the percentage of hydration by ASTM method C492-62T. The results of these tests showing the extraordinary stability of the compositions of the present invention are set forth in Table II.

TABLE II

| No. | Type of Coating | Pounds of Coating/100 lbs. of Refractory | Percent hydration after— 24 hours | 72 hours |
|---|---|---|---|---|
| Example 1 | Hydrocarbon resin. | 1.9 | 0.20 | 2.03 |
| Example 2 | do | 1.9 | 0.23 | 1.23 |
| Example 3 | do | 1.9 | 0.12 | 0.92 |
| Example 4 | do | 1.9 | 0.07 | 1.61 |
| Example 5 | do | 1.9 | 0.12 | 1.08 |
| Test A | Coal tar resin [1] | 1.9 | 0.36 | 4.95 |
| Test B | Oil [2] | 0.7 | 0.10 | 3.87 |
| Test C | Oil [3] | 0.7 | | 5.87 |
| Test D | None | | 21.3 | 31.8 |

[1] Koppers Compound 65-540P.
[2] No 6 fuel oil, Sohio.
[3] Coblax 90, Esso.

A somewhat different granular dolomitic refractory containing about 55% lime, about 38% magnesia, about 1% silica, about 1% alumina and about 5% ferric oxide also having a grain size of about ¼ inch to ⅜ inch was coated with resin while at temperature of 350° F. The hydration resistance produced by this treatment is demonstrated in Table III.

TABLE III

| No. | Resin | Pts. by wt. of coating to 100 pts. by wt. of refractory | Percent hydration after 24 hours' exposure to 160° F. and 85% R.H. |
|---|---|---|---|
| Example 6 | Same as Ex. 1 | 1.9 | 0.46 |
| Example 7 | Same as Ex. 2 | 1.9 | 0.82 |
| Example 8 | Same as Ex. 3 | 1.9 | 1.30 |
| Example 9 | Same as Ex. 4 | 1.9 | 2.57 |
| Test E | Oil [1] | 0.7 | 13.48 |
| Test F | Oil [2] | 0.7 | 13.10 |
| Test G | None | | 23.73 |

[1] No. 6 Fuel Oil.
[2] Coblax 90, Esso.

To demonstrate the effect of grain size of refractory on susceptibility to hydration and to show that coated refractories of the present invention are resistant to hydration even under extremely severe circumstances, additional tests paralleling Examples Nos. 6, 7 and 9 and Tests E, F and G were conducted using the identical refractory except that the grain size was such that it passed through U.S. sieve size No. 8 and was retained on U.S. sieve size No. 16 type screen. The results of these tests are set forth in Table IV.

TABLE IV

| No. | Resin | Pts. by wt. of coating per 100 pts. by wt. of refractory | Percent hydration after 24 hours' exposure to 160° F. and 85% R.H. |
|---|---|---|---|
| Example 10 | Same as Ex. 6 | 1.9 | 2.60 |
| Example 11 | Same as Ex. 7 | 1.9 | 4.72 |
| Example 12 | Same as Ex. 9 | 1.9 | 4.82 |
| Test H | Same as Test E | 0.7 | 21.42 |
| Test I | Same as Test F | 0.7 | 22.34 |
| Test J | None | | 31.88 |

The data in Tables II through IV demonstrates that in a test showing in a highly accelerated fashion the effects of exposure to humid tropical atmospheres, conventional oiling of lime-containing refractories susceptible to hydration is substantially ineffective in providing any industrially acceptable degree of hydration resistance. On the other hand, hydrocarbon resins coated on the refractory surface provide a significant and industrially acceptable degree of resistance to hydration. Actual weathering tests indicate a greater difference than laboratory tests when measuring the degree of protection afforded by the coating of the above mentioned hydrocarbon resins as compared with oils. These resins, due to their saturated aromatic structure, are markedly oxidation and alkali resistant. Also, most bituminous materials absorb water at temperatures in the vicinity of 160° F., which puts these hydrocarbon resins at a disadvantage in comparison to oil in accelerated hydration testing.

It is to be noted that the present invention is adaptable to substantially all refractory materials hydratable under humid atmospheric conditions at temperatures normally encountered in shipping and storing refractories. The invention is particularly useful in conjunction with refractories containing free lime which are used in bulk in the construction and repair of metallurgical furnaces. In instances where the refractory is used in the form of blocks, bricks or other structural units and the resin coating might interfere with proper bonding between units, the resin can be removed by mild heating just prior to installation. Thus even in such circumstances, the advantages of the present invention with regard to storage stability can be enjoyed.

Chemical compositions for refractory disclosed herein in terms of oxides of calcium, magnesium, aluminum, iron and silicon are not to be considered to be complete indications of the particular species present in the refractories per se. As is well known, during burning many chemical and physiochemical reactions can take place including but not limited to chemical reactions between basic and acidic constituents of the raw materials and formation of solid solutions. In the case of dolomite and certain other lime-containing refractories after the dead-burning process is completed, the refractory will contain lime which is free to dissolve in and react with water. In other refractories other constituents may react in the same fashion as lime and thus such other refractories can be equally adapted to be protected by the coating process of the present invention. Further, the hydrocarbon resin coating can be used advantageously to retard or control chemical reactivity of constituents of refractory specialty products. These hydrocarbon resins are relatively inert to inorganic chemicals. During in-bag storage of a refractory specialty product, the coated component would not prereact with the binder. For example, a refractory composition containing as one of its constituents a coated lime or dolomite refractory is stable in the presence of acid or base forming binders. Also, other refractory specialty products that are not presently being manufactured, due to incompatibility (due to chemical reactivity) of constituents, are now possible.

While the present invention has been described in conjunction with advantageous embodiments, those skilled in the art will recognize that modifications and variations may be resorted to without departing from the spirit and scope of the invention.

I claim:

1. A particulate refractory resistant to chemical reaction consisting of particles having a reactive refractory core and a coating on the surface thereof containing a solidified, resinous hydrocarbon from the group consisting of aryl and alkaryl resinous hydrocarbons, said resinous coating being capable of burning off or volatilizing without leaving any substantial carbonaceous residue and said solidified resinous coating being in a proportion of about 1.2 to about 3.4 parts by weight for each 100 parts by weight of refractory.

2. A refractory as in claim 1 which is hydration resistant and which contains a significant amount of hydratable lime with the core.

3. A hydration-resistant refractory as in claim 2 wherein the refractory core is dead-burn dolomite.

4. A hydration-resistant refractory as in claim 2 wherein the coating contains from 0% to about 50% of a resinous material selected from the group consisting of polyvinyl chloride, vinyl chloride-vinyl isobutyl ether copolymer, polyphenylene oxide, coumarone indene resins, partially hydrogenated terphenyls, polychlorinated polyphenyls and cyclohexanone resins and up to an effective amount of a plasticizer.

5. A hydration-resistant refractory as in claim 4 which also comprises a powdered anti-sticking agent on the coated surface.

References Cited

UNITED STATES PATENTS

| | | | |
|---|---|---|---|
| 2,269,660 | 1/1942 | Griffin | 117—100 X |
| 2,776,914 | 1/1957 | Faulwetter | 117—123 X |
| 2,854,347 | 9/1958 | Booth et al. | 117—100 X |
| 3,070,449 | 12/1962 | Davies et al. | 106—61 X |
| 3,141,783 | 7/1964 | Weaver | 106—58 |
| 3,330,890 | 7/1967 | Holt et al. | 106—58 X |
| 3,340,075 | 9/1967 | Stoddard et al. | 106—61 X |
| 2,978,351 | 4/1961 | Pullar | 117—100 X |

FOREIGN PATENTS 209,491   11/1955   Australia.

MURRAY KATZ, Primary Examiner

M. R. P. PERRONE, Jr., Assistant Examiner

U.S. Cl. X.R.

106—58, 61, 63; 117—100, 123